US012061985B2

(12) United States Patent
Koike-Akino et al.

(10) Patent No.: US 12,061,985 B2
(45) Date of Patent: Aug. 13, 2024

(54) AUTOMATED CONSTRUCTION OF NEURAL NETWORK ARCHITECTURE WITH BAYESIAN GRAPH EXPLORATION

(71) Applicant: Mitsubishi Electric Research Laboratories, Inc., Cambridge, MA (US)

(72) Inventors: Toshiaki Koike-Akino, Belmont, MA (US); Ye Wang, Andover, MA (US); Andac Demir, Boston, MA (US); Deniz Erdogmus, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 334 days.

(21) Appl. No.: 16/919,211

(22) Filed: Jul. 2, 2020

(65) Prior Publication Data
US 2022/0004875 A1 Jan. 6, 2022

(51) Int. Cl.
*G06N 3/082* (2023.01)
*G06N 3/04* (2023.01)

(52) U.S. Cl.
CPC .............. *G06N 3/082* (2013.01); *G06N 3/04* (2013.01)

(58) Field of Classification Search
CPC ................................ G06N 3/082; G06N 3/04
USPC ......................................................... 706/25
See application file for complete search history.

(56) References Cited

U.S. PATENT DOCUMENTS

2020/0302662 A1* 9/2020 Homayounfar ...... G06V 10/803

OTHER PUBLICATIONS

Fortunato, et al., "Bayesian Recurrent Neural Networks", arXiv:1704. 02798v4 [cs.LG] May 9, 2019 (Year: 2019).*

(Continued)

*Primary Examiner* — Tsu-Chang Lee
(74) *Attorney, Agent, or Firm* — Gene Vinokur; Hironori Tsukamoto

(57) ABSTRACT

A system for automated construction of an artificial neural network architecture is provided. The system includes a set of interfaces and data links configured to receive and send signals, wherein the signals include datasets of training data, validation data and testing data, wherein the signals include a set of random number factors in multi-dimensional signals X, wherein part of the random number factors are associated with task labels Y to identify, and nuisance variations S. The system further includes a set of memory banks to store a set of reconfigurable deep neural network (DNN) blocks, hyperparameters, trainable variables, intermediate neuron signals, and temporary computation values including forward-pass signals and backward-pass gradients. The system further includes at least one processor, in connection with the interface and the memory banks, configured to submit the signals and the datasets into the reconfigurable DNN blocks, wherein the at least one processor is configured to execute a Bayesian graph exploration using the Bayes-Ball algorithm to reconfigure the DNN blocks such that redundant links are pruned to be compact by modifying the hyperparameters in the memory banks. The system realizes nuisance-robust variational Bayesian inference to be transferable to new datasets in semi-supervised settings.

16 Claims, 14 Drawing Sheets

(56) References Cited

OTHER PUBLICATIONS

Sardinha et al., "Revising the structure of Bayesian network classifiers in the presence of missing data", Information Sciences 439-440 (2018) 108-124 (Year: 2018).*
Welling et al., "Marrying Graphical Models & Deep Learning", Deep Learning (DLSS) and Reinforcement Learning (RLSS) Summer School, Montreal 2017 (Year: 2017).*

* cited by examiner

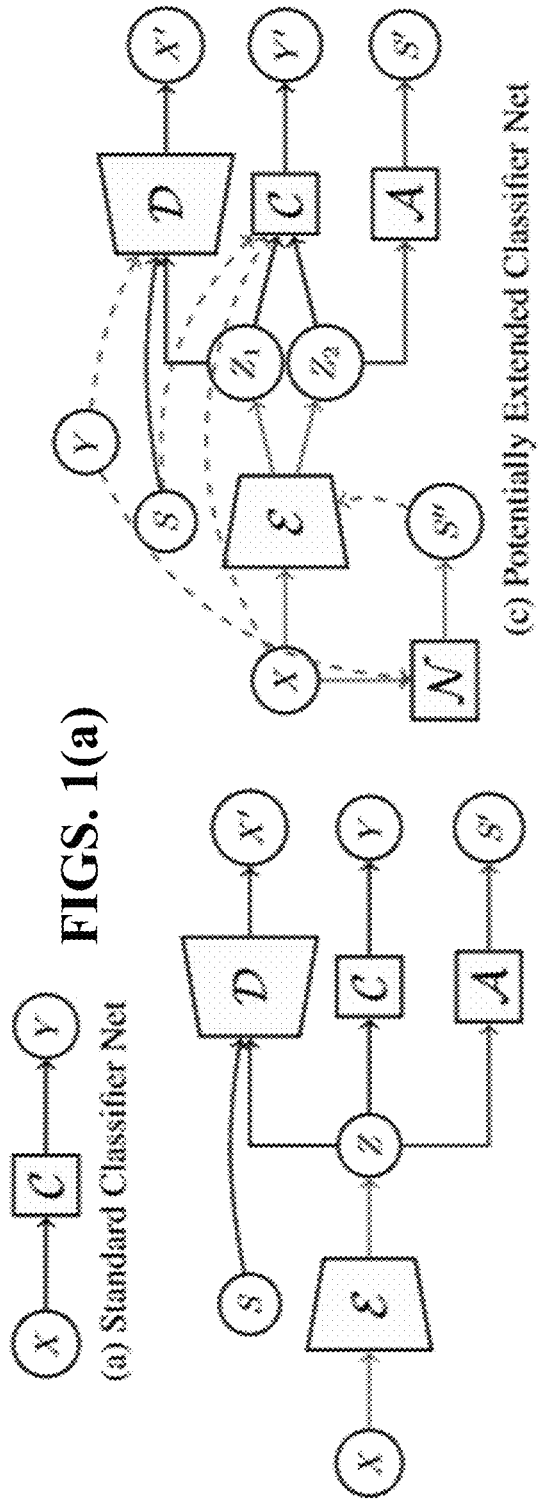

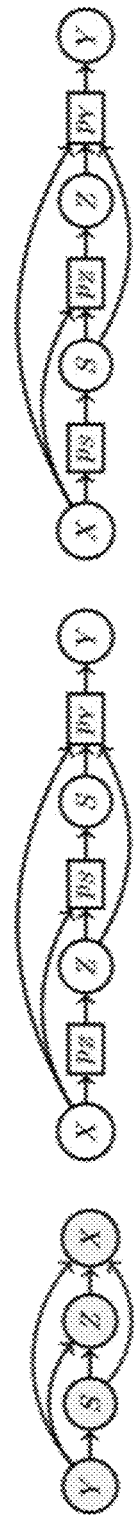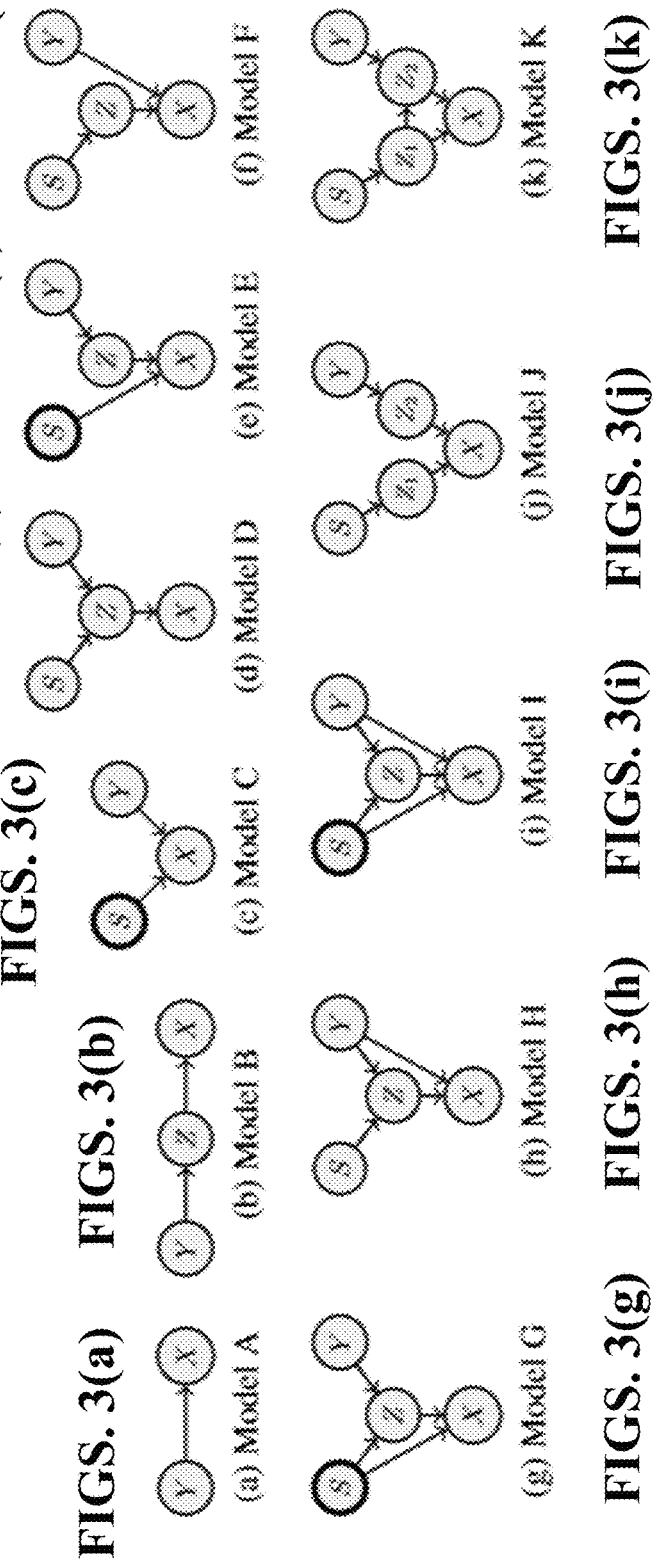

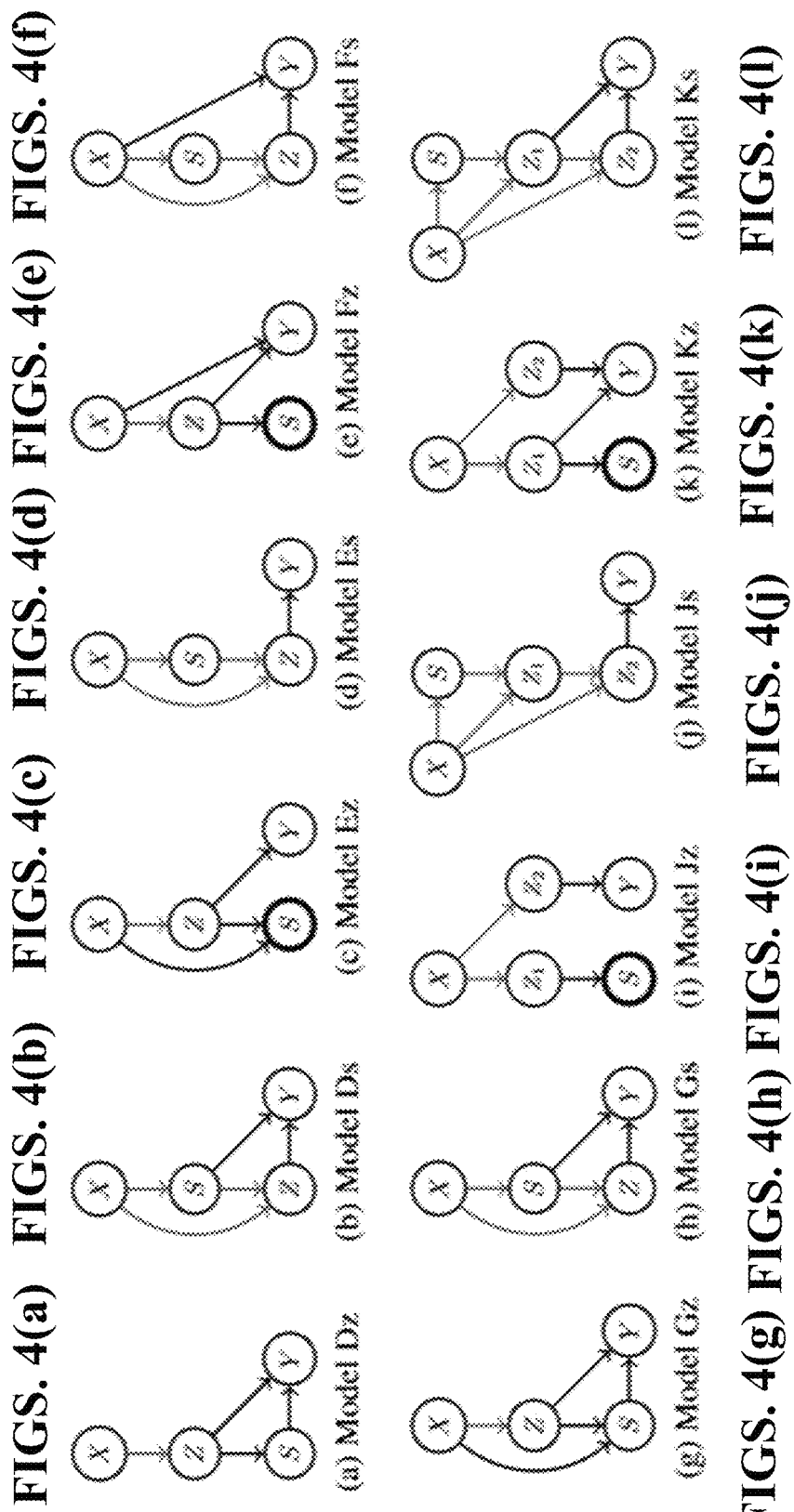

| Dataset | Method | Reconstruction Loss (dB) | | Nuisance Classification (%) | | Task Classification (%) | |
|---|---|---|---|---|---|---|---|
| | | Non-Variational | Variational | Non-Variational | Variational | Non-Variational | Variational |
| MNIST | Model A | −43.4 | — | — | — | 97.7 | — |
| | Model B | −62.0 | −41.4 | — | — | 89.3 | 10.5 |
| | Model Cx | −45.5 | — | 7.0 | — | 97.8 | — |
| | Model Cy | −45.3 | — | 8.2 | — | 97.8 | — |
| | Model Dx | −61.1 | −41.4 | 6.8 | 7.4 | 92.0 | 80.7 |
| | Model Dz | −61.2 | −41.4 | 4.1 | 0.2 | 88.6 | 9.8 |
| | Model Ex | −60.6 | −41.6 | 6.0 | 7.0 | 89.0 | 87.8 |
| | Model Ez | −60.0 | −38.0 | 7.3 | 7.0 | 88.3 | 86.6 |
| | Model Fz | −60.9 | −43.3 | 6.7 | 6.8 | 97.8 | 97.8 |
| | Model Fx | −61.6 | −43.3 | 9.8 | 3.1 | 98.1 | 97.9 |
| | Model Gx | −59.9 | −53.0 | 6.5 | 7.1 | 91.0 | 80.6 |
| | Model Gz | −60.7 | −58.4 | 7.6 | 7.3 | 91.2 | 89.3 |
| | Model H | −60.7 | −43.4 | 8.6 | 7.2 | 97.4 | 97.6 |
| | Model I | −63.2 | −46.2 | 8.1 | 6.6 | 97.8 | 97.3 |
| | Model Jx | −67.1 | −39.2 | 6.8 | 6.8 | 89.9 | 86.9 |
| | Model Jz | −66.2 | −58.1 | 0.8 | 6.9 | 80.0 | 87.0 |
| | Model Kx | −68.4 | −57.3 | 6.9 | 6.9 | 96.9 | 96.2 |
| | Model Kz | −65.6 | −54.5 | 4.4 | 4.2 | 98.0 | 97.2 |

FIG. 6A

| Dataset | Method | Reconstruction Loss (dB) | | Nuisance Classification (%) | | Task Classification (%) | |
|---|---|---|---|---|---|---|---|
| | | Non-Variational | Variational | Non-Variational | Variational | Non-Variational | Variational |
| Stress | Model A | −60.8 | | | | 87.0 | |
| | Model B | −79.2 | −48.4 | | | 86.7 | 80.9 |
| | Model C₁ | −61.4 | | 78.3 | | 89.7 | |
| | Model C₂ | −61.5 | | 78.9 | | 88.5 | |
| | Model D₁ | −73.2 | −48.4 | 79.4 | 79.4 | 87.1 | 84.3 |
| | Model D₂ | −80.9 | −48.3 | 46.9 | 4.8 | 83.3 | 80.7 |
| | Model E₁ | −76.6 | −72.0 | 79.2 | 80.4 | 89.3 | 59.4 |
| | Model E₂ | −80.0 | −48.3 | 81.6 | 82.6 | 84.8 | 80.0 |
| | Model F₁ | −72.8 | −50.8 | 79.8 | 79.5 | 90.0 | 77.6 |
| | Model F₂ | −80.0 | −48.3 | 46.0 | 6.9 | 85.7 | 78.3 |
| | Model G₁ | −74.0 | −71.4 | 79.8 | 76.7 | 88.0 | 81.7 |
| | Model G₂ | −80.9 | −48.3 | 80.6 | 76.1 | 88.8 | 87.5 |
| | Model H | −79.2 | −50.9 | 81.4 | 79.9 | 88.2 | 85.6 |
| | Model I | −80.7 | −61.2 | 88.5 | 80.6 | 91.0 | 88.2 |
| | Model J₁ | −66.7 | −64.7 | 84.5 | 87.7 | 77.4 | 85.6 |
| | Model J₂ | −83.1 | −48.2 | 43.8 | 45.0 | 79.0 | 74.4 |
| | Model K₁ | −83.1 | −65.0 | 79.3 | 79.3 | 84.6 | 78.5 |
| | Model K₂ | −83.1 | −40.0 | 42.4 | 42.0 | 85.5 | 62.6 |

FIG. 6B

| Dataset | Method | Reconstruction Loss (dB) | | Nuisance Classification (%) | | Task Classification (%) | |
|---|---|---|---|---|---|---|---|
| | | Non-Variational | Variational | Non-Variational | Variational | Non-Variational | Variational |
| RSVP | Model A | -38.9 | --- | --- | --- | 92.6 | --- |
| | Model B | -45.3 | -38.5 | --- | --- | 93.2 | 92.9 |
| | Model C₁ | -39.2 | --- | 91.8 | --- | 93.0 | --- |
| | Model C₂ | -39.2 | --- | 91.4 | --- | 93.0 | --- |
| | Model D₁ | -45.3 | -38.9 | 91.3 | 91.7 | 93.1 | 93.0 |
| | Model D₂ | -45.3 | -38.9 | 88.5 | 12.1 | 93.2 | 92.9 |
| | Model E₁ | -45.3 | -38.9 | 91.6 | 91.6 | 92.7 | 93.2 |
| | Model E₂ | -45.6 | -39.3 | 90.5 | 92.1 | 92.9 | 93.1 |
| | Model F₁ | -45.8 | -39.3 | 92.9 | 92.2 | 92.2 | 93.1 |
| | Model F₂ | -66.4 | -40.0 | 90.4 | 10.1 | 92.7 | 91.9 |
| | Model G₁ | -45.8 | -39.3 | 91.3 | 90.9 | 93.1 | 93.0 |
| | Model G₂ | -45.4 | -39.2 | 91.0 | 91.7 | 93.0 | 92.5 |
| | Model H | -45.7 | -38.9 | 91.5 | 91.8 | 92.7 | 93.1 |
| | Model I | -45.3 | -38.9 | 91.0 | 91.5 | 93.8 | 93.9 |
| | Model J₁ | -45.8 | -39.8 | 91.6 | 91.3 | 92.9 | 93.0 |
| | Model J₂ | -40.0 | -39.7 | 40.9 | 42.2 | 93.1 | 92.9 |
| | Model K₁ | -45.9 | -39.9 | 92.6 | 92.0 | 92.8 | 93.0 |
| | Model K₂ | -40.9 | -39.9 | 84.8 | 43.6 | 92.8 | 93.5 |

FIG. 6C

| Dataset | Method | Reconstruction Loss (dB) | | Nuisance Classification (%) | | Task Classification (%) | |
|---|---|---|---|---|---|---|---|
| | | Non-Variational | Variational | Non-Variational | Variational | Non-Variational | Variational |
| MI | Model A | −40.7 | | | | 51.3 | |
| | Model B | −45.9 | −42.5 | | | 52.5 | 40.4 |
| | Model Cx | −40.0 | | 84.3 | | 54.4 | |
| | Model Cy | −40.8 | | 80.7 | | 52.2 | |
| | Model Dx | −45.7 | −41.5 | 84.8 | 83.4 | 54.7 | 30.7 |
| | Model Dz | −52.8 | −39.4 | 74.4 | 92.1 | 68.0 | 38.1 |
| | Model Ex | −45.7 | −40.0 | 82.3 | 83.5 | 51.7 | 25.5 |
| | Model Ez | −45.8 | −42.5 | 4.8 | 1.6 | 47.4 | 52.0 |
| | Model Fz | −45.7 | −40.0 | 82.6 | 83.5 | 51.9 | 45.5 |
| | Model Fz | −45.8 | −42.5 | 4.8 | 4.6 | 47.4 | 51.4 |
| | Model Gx | −45.7 | −40.3 | 82.9 | 85.4 | 47.4 | 35.0 |
| | Model Gz | −45.7 | −42.5 | 78.0 | 83.4 | 46.0 | 34.0 |
| | Model H | −45.9 | −45.5 | 78.2 | 73.8 | 50.3 | 49.7 |
| | Model I | −42.5 | −40.0 | 84.0 | 85.0 | 53.0 | 49.2 |
| | Model Jx | −47.0 | −40.0 | 85.7 | 51.0 | 42.3 | 38.1 |
| | Model Jz | −47.1 | −36.5 | 45.3 | 6.6 | 35.4 | 26.9 |
| | Model Kx | −47.6 | −36.5 | 83.1 | 48.0 | 48.1 | 48.0 |
| | Model Kz | −47.0 | −36.5 | 6.4 | 1.1 | 51.3 | 46.2 |

FIG. 7A

| Dataset | Method | Reconstruction Loss (dB) | | Nuisance Classification (%) | | Task Classification (%) | |
|---|---|---|---|---|---|---|---|
| | | Non-Variational | Variational | Non-Variational | Variational | Non-Variational | Variational |
| EmP | Model A | -37.7 | --- | --- | --- | 69.2 | --- |
| | Model B | -51.7 | -38.5 | --- | --- | 73.9 | 71.0 |
| | Model C$_x$ | -36.9 | --- | 98.0 | --- | 62.6 | --- |
| | Model C$_y$ | -36.0 | --- | 99.8 | --- | 66.2 | --- |
| | Model D$_x$ | -52.6 | -37.1 | 99.5 | 99.4 | 67.3 | 70.3 |
| | Model D$_z$ | -52.7 | -51.6 | 98.8 | 99.5 | 70.6 | 68.1 |
| | Model E$_x$ | -51.4 | -52.3 | 99.4 | 99.2 | 67.9 | 70.0 |
| | Model E$_z$ | -51.7 | -43.4 | 99.6 | 98.7 | 68.6 | 70.7 |
| | Model F$_x$ | -51.8 | -36.6 | 99.0 | 92.1 | 71.0 | 62.4 |
| | Model F$_z$ | -52.5 | -38.1 | 40.0 | 40.0 | 71.2 | 71.8 |
| | Model G$_x$ | -52.8 | -42.0 | 99.5 | 99.3 | 71.0 | 71.0 |
| | Model G$_z$ | -51.1 | -43.6 | 99.4 | 99.3 | 71.5 | 68.3 |
| | Model H | -52.8 | -37.0 | 99.4 | 99.5 | 70.1 | 71.0 |
| | Model I | -51.8 | -36.4 | 99.1 | 98.3 | 70.1 | 70.3 |
| | Model J$_x$ | -61.0 | -37.0 | 99.1 | 99.3 | 68.6 | 86.4 |
| | Model J$_z$ | -60.6 | -50.7 | 89.1 | 45.3 | 68.4 | 70.7 |
| | Model K$_x$ | -51.8 | -51.7 | 99.3 | 99.2 | 68.1 | 67.8 |
| | Model K$_z$ | -61.6 | -50.2 | 43.6 | 46.3 | 70.0 | 68.2 |

FIG. 7B

| Dataset | Method | Reconstruction Loss (dB) | | Nuisance Classification (%) | | Task Classification (%) | |
|---|---|---|---|---|---|---|---|
| | | Non-Variational | Variational | Non-Variational | Variational | Non-Variational | Variational |
| Ninapro | Model A | −37.2 | — | — | — | 69.9 | — |
| | Model B | −51.4 | −36.1 | — | — | 65.3 | 62.0 |
| | Model Cs | −37.8 | — | 45.3 | — | 67.7 | — |
| | Model Cy | −37.8 | — | 44.6 | — | 67.9 | — |
| | Model Ds | −52.1 | −36.1 | 45.5 | 45.5 | 67.4 | 68.9 |
| | Model Dz | −51.6 | −36.1 | 21.8 | 10.2 | 65.4 | 63.0 |
| | Model Es | −50.8 | −36.5 | 45.5 | 45.1 | 65.1 | 62.0 |
| | Model Ez | −51.2 | −36.1 | 46.7 | 44.3 | 65.5 | 62.1 |
| | Model Fs | −51.3 | −36.1 | 45.6 | 45.4 | 66.5 | 67.5 |
| | Model Fz | −57.9 | −41.0 | 22.9 | 21.6 | 64.8 | 62.0 |
| | Model Gs | −51.0 | −36.5 | 45.4 | 44.1 | 66.9 | 63.4 |
| | Model Gz | −51.5 | −36.1 | 45.5 | 44.1 | 66.2 | 63.6 |
| | Model H | −51.0 | −36.1 | 45.6 | 44.1 | 67.2 | 66.6 |
| | Model I | −51.5 | −36.1 | 45.5 | 44.5 | 69.0 | 66.5 |
| | Model Js | −58.4 | −42.0 | 46.4 | 46.3 | 63.4 | 65.1 |
| | Model Jz | −37.7 | −30.0 | 33.6 | 13.1 | 80.8 | 80.2 |
| | Model Ks | −57.9 | −36.7 | 45.7 | 45.3 | 66.1 | 64.1 |
| | Model Kz | −58.1 | −41.1 | 22.3 | 21.2 | 68.9 | 65.9 |

FIG. 7C

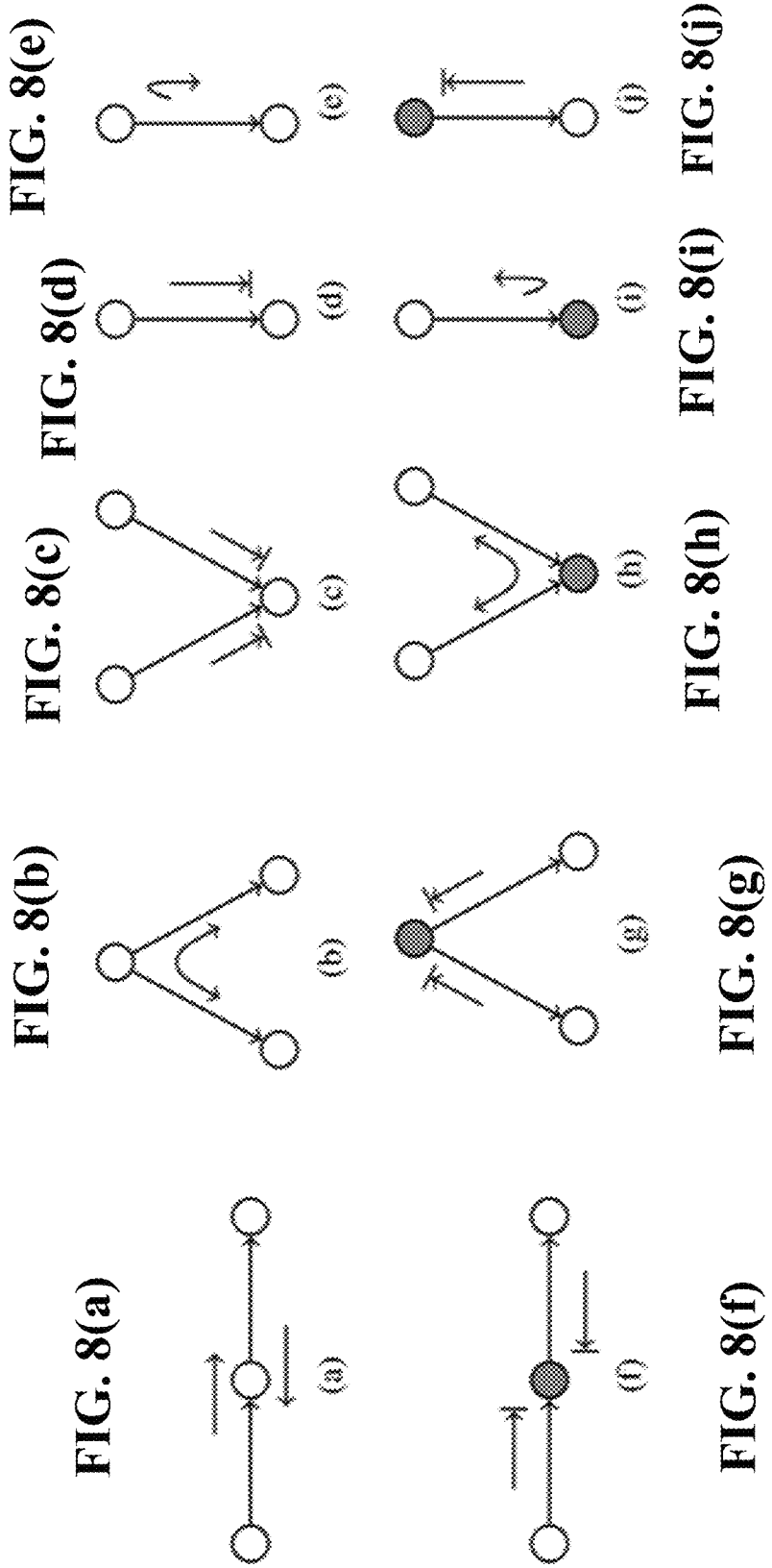

Algorithm 1 Pseudocode for AutoBayes Framework

Require: Nodes set $\mathcal{V} = \{Y, X, S_1, S_2, S_3, \ldots, S_n, Z_1, Z_2, Z_3, \ldots, Z_m\}$, where $Y$ denotes task labels, $X$ is a measurement data, $\mathcal{S} = \{S_1, S_2, S_3, \ldots, S_n\}$ are (potentially multiple) semi-supervised nuisance variations, and $\mathcal{Z} = \{Z_1, Z_2, Z_3, \ldots, Z_m\}$ are (potentially multiple) latent vectors

Ensure: Semi-supervised training/validation datasets

1: for all permutations of node factorization from $Y$ to $X$ do
2:     Let $B_0$ be the corresponding Bayesian graph for the permuted full-chain factorization $p(y) \cdots p(x_1| \cdots) \cdots p(x| \cdots)$
3:     for all combinations of link pruning on the full-chain Bayesian graph $B_0$ do
4:         Let $B$ be the corresponding pruned Bayesian graph
5:         Apply the Bayes-Ball algorithm on $B$ to build a conditional independency list $\mathcal{I}$
6:         for all permutations of node factorization from $X$ to $Y$ do
7:             Let $\mathcal{F}_0$ be the corresponding factor graph, representing a full-chain conditional probability $p(\cdot|x) \cdots p(z_1| \cdots) \cdots p(y| \cdots, x)$
8:             Prune all redundant links in $\mathcal{F}_0$ based on conditional independency $\mathcal{I}$
9:             Let $\mathcal{F}$ be the pruned factor graph
10:            Merge the pruned Bayesian graph $B$ into the pruned factor graph $\mathcal{F}$
11:            Attach an adversary network $\mathcal{A}$ to latent nodes $Z$ for $Z_k, 1 \leq k \in \mathcal{L}$   ▷ At most $(|\mathcal{V}|-2)!$ combinations
12:            Assign an encoder network $\mathcal{E}$ for $p(\mathcal{Z}|\cdots)$ in the merged factor graph   ▷ At most $2^{|\mathcal{V}|(|\mathcal{V}|-1)/2}$ combinations
13:            Assign a decoder network $\mathcal{D}$ for $p(x|\cdots)$ in the merged factor graph
14:            Assign a nuisance indicator network $\mathcal{N}$ for $p(\mathcal{S}|\cdots)$ in the merged factor graph   ▷ At most $(|\mathcal{V}|-2)!$ combinations
15:            Assign a classifier network $\mathcal{C}$ for $p(y|\cdots)$ in the merged factor graph
16:            Adversary train the whole DNN structure with variational reparameterization to minimize a loss function in (11)
17:         end for
18:     end for
19: end for
20: return the best model having highest task accuracy in validation sets

FIG. 9

| Classifier C | Encoder E | Decoder D | Nuisance N | Adversary A |
|---|---|---|---|---|
| FC(2\|Z\|) | Conv(1, 15)⁵⁰ | FC(207) | FC(2\|Z\|) | FC(2\|Z\|) |
| BN+ReLU | BN+ReLU | ReLU | BN+ReLU | BN+ReLU |
| FC(\|Y\|) | Conv(1, 7)⁵⁰ | Conv(C, 1)⁵⁰ | FC(\|S\|) | FC(\|S\|) |
| | BN+ReLU | BN+ReLU | | |
| | Conv(1, 3)⁵⁰ | Conv(1, 3)⁵⁰ | | |
| | BN+ReLU | BN+ReLU | | |
| | Conv(C, 1)⁵⁰ | Conv(1, 7)⁵⁰ | | |
| | FC(\|Z\|) | BN+ReLU | | |
| | | Conv(1, 15)⁵⁰ | | |

FIG. 10

AUTOMATED CONSTRUCTION OF NEURAL NETWORK ARCHITECTURE WITH BAYESIAN GRAPH EXPLORATION

FIELD OF THE INVENTION

The present invention is related to an automated construction system of an artificial neural network, and more particularly to an automated construction system of an artificial neural network with Bayesian graph exploration.

Background & Prior Art

The great advancement of deep learning techniques based on deep neural networks (DNN) has resolved various issues in data processing, including media signal processing for video, speech, and images, physical data processing for radio wave, electrical pulse, and optical beams, and physiological data processing for heart rate, temperature, and blood pressure. For example, DNNs enabled more practical design of human-machine interfaces (HMI) through the analysis of the user's physiological data, such as electroencephalogram (EEG) and electromyogram (EMG). However, such biosignals are highly subject to variation depending on the biological states of each subject. Hence, frequent calibration is often required in typical HMI systems.

Toward resolving this issue, subject-invariant methods, employing adversarial training with Conditional Variational AutoEncoder (A-CVAE), have emerged to reduce user calibration for realizing successful HMI systems. Compared to a standard DNN classifier, integrating additional functional blocks for encoder, nuisance-conditional decoder, and adversary networks offers excellent subject-invariant performance. The DNN structure may be potentially extended with more functional blocks and more latent nodes. However, most works rely on human design to determine the block connectivity and architecture of DNNs. Specifically, DNN techniques are often hand-crafted with experts who knows data models with human insights. How to optimize the architecture of DNN requires trial and error approaches. A new framework of automated machine learning (AutoML) was proposed to automatically explore different DNN architectures. Automation of hyperparameter and architecture exploration in the context of AutoML can facilitate DNN design suited for subject-invariant biosignal processing.

Learning data representations that capture task-related features, but are invariant to nuisance variations remains a key challenge in machine learning. The VAE introduced variational Bayesian inference methods, incorporating autoassociative architectures, where generative and inference models can be learned jointly. This method was extended with the CVAE, which introduces a conditioning variable that could be used to represent nuisance, and a regularized VAE, which considers disentangling the nuisance variable from the latent representation. The concept of adversarial was introduced with Generative Adversarial Networks (GAN), and has been adopted into myriad applications. The simultaneously discovered Adversarially Learned Inference (ALI) and Bidirectional GAN (BiGAN) propose an adversarial approach toward training an autoencoder. Adversarial training has also been combined with VAE to regularize and disentangle the latent representations so that nuisance-rubost learning is realized. Searching DNN models with hyperparameter optimization has been intensively investigated in a related framework called AutoML. The automated methods include architecture search, learning rule design, and augmentation exploration. Most work used either evolutionary optimization or reinforcement learning framework to adjust hyperparameters or to construct network architecture from pre-selected building blocks. Recent AutoML-Zero considers an extension to preclude human knowledge and insights for fully automated designs from scratch.

However, AutoML requires a lot of exploration time to find the best hyperparameters due to the search space explosion. In addition, without any good reasoning, most search space of link connectives will be pointless. Accordingly, there is a need to develop a system for an automated construction of a neural network with more systematic exploration methods.

SUMMARY OF THE INVENTION

The present disclosure relates to systems and methods for an automated construction of an artificial neural network with Bayesian graph exploration. Specifically, the system of the present invention introduces an automated Bayesian inference framework, called AutoBayes, that explores different graphical models linking classifier, encoder, decoder, estimator and adversary network blocks to optimize nuisance-invariant machine learning pipelines. AutoBayes also enables justifying disentangled representation, which splits the latent variable into multiple pieces to impose different relation with subject/session-variation and task labels. The framework is applied to a series of physiological datasets, where we have access to subject and class labels during training, and provide analysis of its capability for subject transfer learning with/without variational modeling and adversarial training. The framework can be effectively utilized in semi-supervised multi-class classification, and reconstruction tasks for datasets in different domains as well.

The core non-trivial achievement by this invention over the existing priors is five-fold as follows:
a. AutoBayes explores potential graphical models inherent to the data, rather than exploring hyperparameters of DNN blocks.
b. AutoBayes offers a solid reason of how to connect multiple DNN blocks to impose conditioning and adversary censoring for the task classifier, feature encoder, decoder, nuisance indicator and adversary networks, based on an explored Bayesian graph.
c. It provides a systematic automation framework to explore different inference models through the use of the Bayes-Ball algorithm and ordered factorization.
d. The framework is also extensible to multiple latent representations and multiple nuisances factors.
e. Besides fully-supervised training, AutoBayes can automatically build some relevant graphical models suited for semi-supervised learning.

Some embodiments of the present disclosure are based on recognition that a new concept called AutoBayes which explores various different Bayesian graph models to facilitate searching for the best inference strategy, suited for nuisance-robust HMI systems. With the Bayes-Ball algorithm, our method can automatically construct reasonable link connections among classifier, encoder, decoder, nuisance estimator and adversary DNN blocks. As a proof-of-concept analysis, we demonstrate the benefit of AutoBayes for various neuro-/physiological datasets. We observed a huge performance gap between the best and worst graph models, implying that the use of one deterministic model without graph exploration can potentially suffer a poor classification result. In addition, the best model at one physiological dataset does not always perform best for different data, that encourages us to use AutoBayes for adaptive model generation given target datasets. One embodiment extends the AutoBayes framework to integrate AutoML to optimize hyperparameters of each DNN block. How to handle the exponentially growing search space of possible Bayesian graphs along with the number of random variables is also dealt with belief propagation analysis over factor graphs for progressive edge pruning/grafting.

Our invention enabled AutoML to efficiently search for potential architectures which have a solid theoretical reason to consider. The method of invention is based on the realization that dataset is hypothetically modeled with a directed Bayesian graph, and thus we call AutoBayes method. One embodiment uses Bayesian graph exploration with different factorization orders of joint probability distribution. The invention also provides a method to create compact architecture with pruning links based on conditional independency derived from the Bayes Ball algorithm over the Bayesian graph hypothesis. Yet another method can optimize the inference graph with different factorization order of likelihood, which enables automatically constructing joint generative and inference graphs. It realizes a natural architecture based on VAE with/without conditional links. Also, another embodiment uses adversarial training with adversarial networks which are attached with latent variables to be independent of nuisance parameters, so that nuisance-robust feature extraction is realized. Yet another case uses intentionally redundant graphs with conditional grafting to promote nuisance-robust feature extraction. Another embodiment uses variational sampling for semi-supervised setting. Another embodiment provides a way to transform one data structure to another data structure of mismatched dimensionality, by using tensor projection. Yet another embodiment uses an ensemble graph which combines estimates of multiple different Bayesian graphs to improve the performance. One embodiment realizes the ensemble methods using dynamic attention network. Also cycle consistency of VAE, and model consistency across different inference graphs are jointly dealt with. Another embodiment uses graph neural networks to exploit geometry information of the data, and pruning strategy is assisted by the belief propagation across Bayesian graphs to validate the relevance. Also, hyperparameters of each DNN blocks are adjusted by integrating AutoBayes and AutoML. Wasserstein distance can be also used instead of divergence.

The system provides a way of systematic automation framework, which searches for the best inference graph model associated to Bayesian graph model well-suited to reproduce the training datasets. The proposed system automatically formulates various different Bayesian graphs by factorizing the joint probability distribution in terms of data, class label, subject identification (ID), and inherent latent representations. Given Bayesian graphs, some meaningful inference graphs are generated through the Bayes-Ball algorithm for pruning redundant links to achieve high-accuracy estimation. In order to promote robustness against nuisance parameters such as subject IDs, the explored Bayesian graphs can provide reasoning to use adversarial training with/without variational modeling and latent disentanglement. As one of embodiment, we demonstrate that AutoBayes can achieve excellent performance across various physiological datasets.

BRIEF DESCRIPTION OF THE DRAWING

The accompanying drawings, which are included to provide a further understanding of the invention, illustrate embodiments of the invention and together with the description, explaining the principle of the invention.

FIGS. 1(a), 1(b) and 1(c) show the inference methods to classify Y given data X under latent Z and semi-labeled nuisance S, according to embodiments of the present disclosure;

FIGS. 2(a), 2(b) and 2(c) show Boyesian Model (graph), Z-First Interference and S-First Interference, corresponding to Fully-connected Bayesian graph and inference models for Z-first or S-first factorizations, according to some embodiments of the present disclosure;

FIGS. 3(a), 3(b), 3(c), 3(d), 3(e), 3(f), 3(g), 3(h), 3(i), 3(j) and 3(k) show example Bayesian graphs for data generative models under automatic exploration, according to some embodiments of the present disclosure;

FIGS. 4(a), 4(b), 4(c), 4(d), 4(e), 4(f), 4(g), 4(h), 4(i), 4(j), 4(k) and 4(l) show Z-first and S-first inference graph models relevant for generative models D-G, J, and K, according to some embodiments of the present disclosure;

FIGS. 6A, 6B and 6C show performance of datasets indicating the reconstruction loss, the scores of nuisance classification and task classification in variational/non-variational and adversarial/non-adversarial setting, according embodiments of the present disclosure;

FIGS. 7A, 7B and 7C show performance of dataset indicating that the best inference strategy highly depends on datasets, according embodiments of the present disclosure;

FIGS. 8(a), 8(b), 8(c), 8(d), 8(e), 8(f), 8(g), 8(h), 8(i) and 8(j) show Bayes-Ball algorithm basic rules with shaded conditional nodes, according to embodiments of the present disclosure;

FIG. 9 shows an example algorithm describing the overall procedure of the AutoBoyes algorithm, according embodiments of the present disclosure;

FIG. 10 shows an example of DNN blocks for classifier, encoder, decoder, estimator, and adversary, according to embodiments of the present disclosure.

DETAILED DESCRIPTION OF THE PREFERRED EMBODIMENTS

Figure 5:
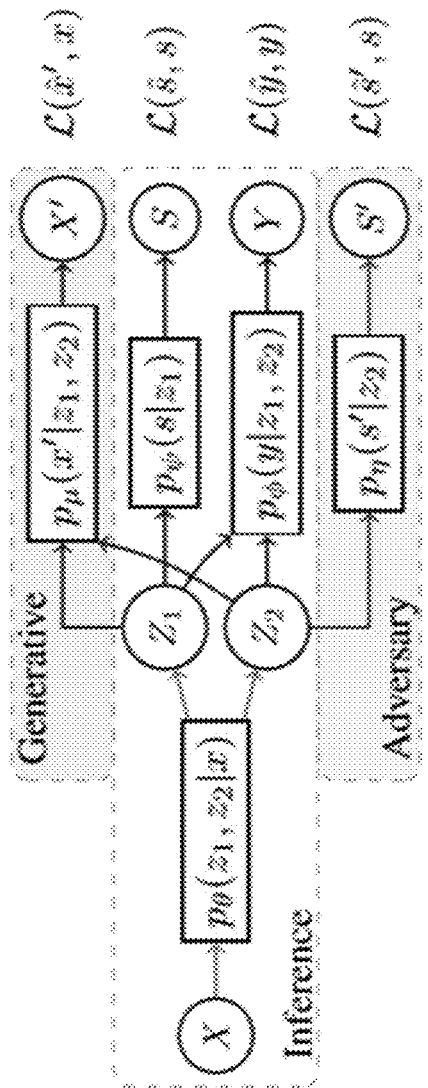
FIG. 5 is a schematic illustrating an overall network structure for pairing generative model K and inference model Kz, according to some embodiments of the present disclosure.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

FIGS. 1(a), 1(b) and 1(c) show schematics illustrating three classifier nets (a), (b) and (c) describing the inference methods to classify Y given data X under latent Z and semi-labeled nuisance variation S, according to embodiments of the present disclosure.

At the core of our methodology is the consideration of graphical Bayesian models that capture the probabilistic relationship between random variables representing the data features X, task labels Y, nuisance variation labels S, and (potential) latent representations Z. The ultimate goal is to infer the task label Y from the measured data feature X, which is hindered by the presence of nuisance variations (e.g., inter-subject/session variations) that are (partially) labelled by S. Latent representations Z (and further denoted by $Z_1, Z_2, \ldots$, as needed) are also optionally introduced into these models to help capture the underlying relationship between S, X, and Y.

We let p(y, s, z, x) denote the joint probability distribution underlying the biosignal datasets for the four random variables, i.e., Y, S, Z, and X. The chain rule can yield the following factorization for a generative model from Y to X (note that at most 4! factorization orders exist including useless ones):

$$p(y,s,z,x)=p(y)p(s|y)p(z|s,y)p(x|z,s,y), \quad (1)$$

which is visualized in Bayesian graph of FIG. 2(a). The probability conditioned on X can be factorized, e.g., as follows (among 3! different orders of inference factorization for four-node graphs):

$$p(y, s, z \mid x) = \begin{cases} p(z|x)p(s|z, x)p(y|s, z, x), & Z\text{-first-inference} \\ p(s|x)p(z|s, x)p(y|z, s, x) & S\text{-first-inference} \end{cases} \quad (2)$$

which are marginalized to obtain the likelihood of class Y given data X: $p(y|x)=E_{s,z}[p(y, s, z|x)]$. The above two inference scheduling strategies in (2) are illustrated in factor graph models as in FIGS. 2(b) and 2(c), respectively. The number of possible Bayesian graphs and inference graphs will increase rapidly when considering more nodes with multiple nuisance and latent variables.

The above graphical models in FIGS. 2(a), 2(b) and 2(c) do not impose any assumption of potentially inherent independency in datasets and thus most generic. However, depending on underlying independency in biosignals, we may be able to prune some edges in those graphs. For example, if the data has Markov chain of Y—X independent of S and Z, all links except one between X and Y will be unreasonable, resulting into FIG. 1(a). This implies that the most complicated inference model having high degrees of freedom does not always perform best across arbitrary datasets. It motivates us to consider an extended AutoML framework which automatically explores best pair of inference factor graph and corresponding Bayesian graph models matching datasets in addition to the hyperparameter design.

The AutoBayes begins with exploring any potential Bayesian graphs by cutting links of the full-chain graph in FIG. 2(a), imposing possible independence. We then adopt the Bayes-Ball algorithm on each hypothetical Bayesian graph to examine conditional independence over different inference strategies, e.g., full-chain Z-/S-first inference graphs in FIGS. 2(b)/2(c). The Bayes-Ball justifies the reasonable pruning of the links in the full-chain inference graphs FIGS. 2(b)/2(c), and also the potential adversary censoring when Z is independent of S. This process automatically constructs a connectivity of inference, generative, and adversary blocks with good reasoning, e.g., to construct A-CVAE classifier in FIG. 1(b) from arbitrary model of FIG. 1(c). Below describes a few embodiments of the Bayesian graph exploration before describing more detail system configurations for generic cases.

Bayesian Graph Exploration

Given sensor measurements such as media data, physical data and physiological data, we never know the true joint probability beforehand, and therefore we shall assume one of possible generative models. AutoBayes aims to explore any such potential graph models to match the measurement distributions. As the maximum possible number of graphical models is huge even for a four-node case involving Y, S, Z and X, we show some embodiments of such Bayesian graphs in FIGS. 3(a)-3(k). Each Bayesian graph corresponds to the following assumption of the joint probability factorization (p(x| . . . ) term specifies a generative model of X):

$$p(y, s, z, x) = \quad (3)$$

$$\begin{cases} p(y)p(s|\cancel{y})p(z|\cancel{s},\cancel{y})p(x|\cancel{z},\cancel{s}, y), & \text{Model-A} \\ p(y)p(s|\cancel{y})p(z|\cancel{s}, y)p(x|z, \cancel{s},\cancel{y}), & \text{Model-B} \\ p(y)p(s|\cancel{y})p(z|\cancel{s},\cancel{y})p(x|\cancel{z}, s, y), & \text{Model-C} \\ p(y)p(s|\cancel{y})p(z|s, y)p(x|z, \cancel{s},\cancel{y}), & \text{Model-D} \\ p(y)p(s|\cancel{y})p(z|\cancel{s}, y)p(x|z, s, \cancel{y}), & \text{Model-E} \\ p(y)p(s|\cancel{y})p(z|s, \cancel{y})p(x|z, \cancel{s}, y), & \text{Model-F} \\ p(y)p(s|\cancel{y})p(z|s, y)p(x|z, s, \cancel{y}), & \text{Model-G} \\ p(y)p(s|\cancel{y})p(z|s, y)p(x|z, \cancel{s}, y), & \text{Model-H} \\ p(y)p(s|\cancel{y})p(z|s, y)p(x|z, s, y), & \text{Model-I} \\ p(y)p(s|\cancel{y})p(z_1|s, \cancel{y})p(z_2|\cancel{z_1}, y)p(x|z_2, z_1, \cancel{s}\cancel{y}), & \text{Model-J} \\ p(y)p(s|\cancel{y})p(z_1|s, \cancel{y})p(z_2|z_1, \cancel{y})p(x|z_2, z_1, \cancel{s}\cancel{y}), & \text{Model-K} \end{cases}$$

where we explicitly indicate independence by slash-cancelled factors from the full-chain case in (1). Depending on the assumed Bayesian graph, the relevant inference strategy will vary as some variables may be conditionally independent, which enables pruning links in the inference factor graphs. As shown in FIGS. 4(a)-4(l), the reasonable inference graph model can be automatically generated by the Bayes-Ball algorithm on each Bayesian graph hypothesis inherent in datasets. Specifically, the conditional probability p(y, s, z|x) can be obtained for each model as below.

Bayesian Graph Model A (Direct Markov):

The simplest model between X and Y would be a single Markov chain without any dependency of S and Z, shown in Bayesian graph of FIG. 3(a). This graphical model puts an assumption that the biosignals are nuisance-invariant. For this case, there is no reason to employ complicated inference models such as A-CVAE since most factors will be independent as p(y, s, z|x)=p(z|x)p(s|z, x)p(y|s, z, x). We hence should use a standard classification method, as in FIG. 1(a), to infer Y given X, based on the inference model p(y|x) without involving S and Z.

Bayesian Graph Model B (Markov Latent):

Assuming a latent Z can work in a Markov chain of Y—Z—X shown in FIG. 3(b), we obtain a simple inference model: p(y, s, z|x)=p(z|x)p(s|z, x)p(y|s, z, x). Note that this model assumes independence between Z and S, and thus adversarial censoring can make it more robust against nuisance. Specifically, an adversarial DNN block estimating nuisance variations should be attached with the latent vectors, and alternatingly trained to realize adversarial min-max optimization.

Bayesian Graph Model C (Subject-Dependent):

We may model the case when the data X directly depends on subject S and task Y, shown in FIG. 3(c). For this case, we may consider the corresponding inference models due to the Bayes-Ball:

$$p(y, s, z \mid x) = \begin{cases} p(s \mid x)p(z \mid s, x)p(y \mid s, z, x), & \text{Model-Cs} \\ p(y \mid x)p(s \mid y, x)p(z \mid s, y, x). & \text{Model-Cy} \end{cases} \quad (4)$$

Note that this model does not depend on Z, and thus Z-first inference strategy reduces to S-first inference strategy. As a reference, we here consider additional Y-first inference strategy to evaluate the difference.

Bayesian Graph Model D (Latent Summary):

Another graphical model is shown in FIG. 3(d), where a latent space bridges all other random variables. The Bayes-Ball yields the following models:

$$p(y, s, z \mid x) = \begin{cases} p(z \mid x)p(s \mid z, x)p(y \mid s, z, x), & \text{Model-Dz} \\ p(s \mid x)p(z \mid s, x)p(y \mid z, s, x), & \text{Model-Ds} \end{cases} \quad (5)$$

whose graphical models are depicted in FIGS. 4(a) and 4(b), respectively.

Bayesian Graph Model E (Task-Summary Latent):

Another graphical model involving latent variables is shown in FIG. 3(e), where a latent space only summarizes Y. The Bayes-Ball yields the following inference models:

$$p(y, s, z \mid x) = \begin{cases} p(z \mid x)p(s \mid z, x)p(y \mid z, s, x), & \text{Model-Ez} \\ p(s \mid x)p(z \mid s, x)p(y \mid s, z, x), & \text{Model-Es} \end{cases} \quad (6)$$

which are illustrated in FIGS. 4(c) and 4(d). Note that the generative model E has no marginal dependency between Z and S, which provides the reason to use adversarial censoring to suppress nuisance information S in the latent space Z. In addition, because the generative model of X is dependent on both Z and S, it is justified to employ the A-CVAE classifier shown in FIG. 1(b).

Bayesian Graph Model F (Subject-Summary Latent):

Consider FIG. 3(f), where a latent variable summarizes subject information S. The Bayes-Ball provides the inference graphs shown in FIGS. 4(e) and 4(f), which respectively correspond to:

$$p(y, s, z \mid x) = \begin{cases} p(z \mid x)p(s \mid z, x)p(y \mid s, x, z), & \text{Model-Fz} \\ p(s \mid x)p(z \mid s, x)p(y \mid x, s, z). & \text{Model-Fs} \end{cases} \quad (7)$$

Bayesian Graph Model G: Letting the joint distribution follow the model G in FIG. 3(g), we obtain the following inference models via the Bayes-Ball:

$$p(y, s, z \mid x) = \begin{cases} p(z \mid x)p(s \mid z, x)p(y \mid s, z, x), & \text{Model-Gz} \\ p(s \mid x)p(z \mid s, x)p(y \mid z, s, x). & \text{Model-Gs} \end{cases} \quad (8)$$

whose graphical models are described in FIGS. 4(g) and 4(h). Note that the inference model Gs in FIG. 4(h) is identical to the inference model Ds in FIG. 4(b). Although the inference graphs Gs and Ds are identical, the generative model of X is different as shown in FIGS. 3(g) and 3(d). Specifically, VAE decoder for the model G should feed S along with variational latent space Z, and thus using CVAE is justified for the model G but D. This difference of the generative models can potentially make a different impact on the performance of inference despite the inference graph alone is identical.

Bayesian Graph Models H and I:

Both the generative models H and I shown in FIGS. 3(h) and 3(i) have the fully-connected inference strategies as given in (2), whose graphs are shown in FIGS. 2(a)-2(c), respectively, since no useful conditional independency can be found with the Bayes-Ball. Analogous to the relation of models Ds and Gs, the inference graph can be identical for Bayesian graphs H and I, whereas the generative model of X is different as shown in FIGS. 3(h) and 3(i).

Bayesian Graph Model J (Disentangled Latent):

We can also consider multiple latent vectors to generalize the Bayesian graph with more vertices. We here focus on two such embodiments of graph models with two-latent spaces as shown in FIGS. 3(j) and 3(k). Those models are identical class of the model D, except that a single latent Z is disentangled into two parts $Z_1$ and $Z_2$, respectively associated with S and Y. Given the Bayesian graph of FIG. 3(j), the Bayes-Ball yields some inference strategies including the following two models:

$$p(y, s, z_1, z_2 \mid x) = \qquad (9)$$
$$\begin{cases} p(z_1, z_2 \mid x)p(s \mid z_1, z_2, x)p(y \mid s, z_1, z_2, x), & \text{Model-Jz} \\ p(s \mid x)p(z_1 \mid s, x)p(z_2 \mid s, z_1, x)p(y \mid s, z_1, z_2, x), & \text{Model-Js} \end{cases}$$

which are shown in FIGS. 4(i) and (j). Note that $Z_1$ is marginally independent of the nuisance variable S, which encourages the use of adversarial training to be robust against subject/session variations.

Bayesian Graph Model K (Conditionally Disentangled Latent):

Another modified model in FIG. 3(k) linking $Z_1$ and $Z_2$ yields the following inference models:

$$p(y, s, z_1, z_2 \mid x) = \qquad (10)$$
$$\begin{cases} p(z_1, z_2 \mid x)p(s \mid z_1, z_2, x)p(y \mid s, z_1, z_2, x), & \text{Model-Kz} \\ p(s \mid x)p(z_1 \mid s, x)p(z_2 \mid s, z_1, x)p(y \mid s, z_1, z_2, x), & \text{Model-Ks} \end{cases}$$

as shown in FIGS. 4(k) and (l). The major difference from the model J lies in the fact that the inference graph should use $Z_1$ along with $Z_2$ to infer Y.

As described in the above embodiments, AutoBayes explores different Bayesian graphs FIG. 3 by assuming independent factors in (3) to generate a few non-redundant inference graphs FIG. 4 through the Bayes-Ball algorithm to prune links. Given a pair of generative graph and inference graph, the corresponding DNN structures will be trained. For example of the generative graph model K in FIG. 3(k), one relevant inference graph Kz in FIG. 4(k) will result in the overall network structure as shown in FIG. 5, where adversary network is attached as $Z_2$ is (conditionally) independent of S. Each factor block is realized by a DNN, e.g., $p_\theta(z_1, z_2 \mid x)$ is a DNN parameterized by θ, and whole networks except adversary network are optimized to minimize corresponding loss functions including $L(\hat{y}, y)$ as follows:

$$(\theta, \psi, \eta, \mu) = \underset{\theta, \psi, \eta, \mu}{\operatorname{argmin}} \qquad (11)$$
$$E[L(\hat{y}, y) + \lambda_s L(\hat{s}, s) + \lambda_x L(\hat{x}', x) + \lambda_z KL(z_1, z_2) - \lambda_a L(\hat{s}', s)],$$

-continued $$(z_1, z_2) = p_\theta(x), \hat{y} = p_\psi(z_1, z_2), \quad (12)$$
$$\hat{s} = p_\phi(z_1), \hat{x}' = p_\mu(z_1), \hat{s}' = p_\eta(z_1, z_2),$$

where $\lambda_*$ denotes a regularization coefficient, KL is the Kullback-Leibler divergence, and the adversary network $p_\eta(s'|z_2)$ is trained to minimize $L(\hat{s}',s)$ in an alternating fashion.

Bayes-Ball Algorithm

The system of the present invention relies on the Bayes-Ball algorithm to facilitate an automatic pruning of links in inference factor graphs through the analysis of conditional independency. The Bayes-Ball algorithm uses just ten rules to identify conditional independency as shown in FIG. 8. Given directed Bayesian graphs, we can determine whether a conditional independence between two disjoint sets of nodes given conditioning on other nodes by applying a graph separation criterion. Specifically, an undirected path is activated if a Bayes ball can travel along without encountering a stopping arrow symbol in FIG. 8. If there are no active paths between two sets of nodes when some other conditioning nodes are shaded, then those sets of random variables are conditionally independent. With the Bayes-Ball algorithm, the invention generates a list specifying the independency relationship of two disjoint nodes for Auto-Bayes algorithm.

AutoBayes Algorithm

FIG. 9 shows the overall procedure of the AutoBayes algorithm described in the pseudocode of Algorithm 1, according to some embodiments of the present disclosure for more generic cases not only in FIGS. 3 and 4. The Auto-Bayes automatically constructs non-redundant inference factor graphs given a hypothetical Bayesian graph assumption, through the use of the Bayes-Ball algorithm. Depending on the derived conditional independency and pruned factor graphs, DNN blocks for encoder, decoder, classifier, nuisance estimator and adversary are reasonably connected. The whole DNN blocks are trained with adversary learning in a variational Bayesian inference. Note that hyperparameters of each DNN block can be further optimized by AutoML on top of AutoBayes framework as one embodiment.

The system of invention uses memory banks to store hyperparameters, trainable variables, intermediate neuron signals, and temporary computation values including forward-pass signals and backward-pass gradients. It reconfigures DNN blocks by exploring various Bayesian graphs based on the Bayes-Ball algorithm such that redundant links are pruned to be compact. Based on some different criteria to match the Bayesian model with datasets, AutoBayes first creates a full-chain directed Bayesian graph to connect all nodes in a specific permutation order. The system then prunes a specific combination of the graph edges in the full-chain Bayesian graph. Next, the Bayes-Ball algorithms is employed to list up conditional independency relations across two disjoint nodes. For each Bayesian graph in hypothesis, another full-chain directed factor graph is constructed from the node associated with the data signals X to infer the other nodes, in a different factorization order. Pruning redundant links in the full-chain factor graph is then adopted depending on the independency list, thereby the DNN links can be compact. In another embodiment, redundant links are intentionally kept and progressively grafting. The pruned Bayesian graph and the pruned factor graph are combined such that a generative model and an inference model are consistent. Given the combined graphical models, all DNN blocks for encoder, decoder, classifier, estimator, and adversary networks are associated in connection to the model. This AutoBayes realizes nuisance-robust inference which can be transferred to a new data domain for the testing datasets.

The AutoBayes algorithm can be generalized for more than 4 node factors. For example of such embodiments, the nuisance variations S are further decomposed into multiple factors of variations $S_1, S_2, \ldots, S_N$ as multiple-domain side information according to a combination of supervised, semi-supervised and unsupervised settings. For another example of embodiments, the latent variables are further decomposed into multiple factors of latent variables $Z_1, Z_2, \ldots, Z_L$ as disentangled feature vectors. FIG. 5 is one of such embodiments. For example, of an embodiment having decomposed factors, the nuisance variations are grouped into different factors such as subject identifications, session numbers, biological states, environmental states, sensor states, locations, orientations, sampling rates, time and sensitivities.

In the exploration of different graphical models, one embodiment uses output of all different models explored to improve the performance, for example with weighted sum to realize ensemble performance. Yet another embodiment uses additional DNN block which learns the best weights to combine different graphical models. This embodiment is realized with attention networks to adaptively select relevant graphical models given data. This embodiment considers consensus equilibrium across different graphical models as the original joint probability is identical. It also recognizes a cycle consistency of encoder/decoder DNN blocks.

Enablement Examples with Experimental Evaluation

Example Dataset:

We experimentally demonstrate the performance of Auto-Bayes for publicly available physiological datasets as well as a benchmark MNIST as follows.

QMNIST:

A benchmark hand-written digit image MNIST dataset with extended label information including a writer ID number. There are $|S|=539$ writers for classifying $|Y|=10$ digits from grayscale 28×28 pixel images over 60,000 training samples.

Stress:

A physiological dataset considering neurological stress level. $|Y|=4$ discrete stress states from $|S|=20$ subjects. The data were recorded with C=7 sensors including heart rates, electrodermal activity, temperature, and arterial oxygen level, for 300 samples.

RSVP:

An EEG data for rapid serial visual presentation (RSVP) drowsiness. $|S|=10$ subjects at three sessions for 41,400 epochs of C=16 channels for T=128 samples. $|Y|=4$ labels for emotion elicitation, resting-state, or motor imagery/execution task.

MI:

The PhysioNet EEG Motor Imagery (MI) dataset. The dataset consists of T=480 samples of C=64 channels data for $|S|=106$ subjects. $|Y|=4$-class MI task for 90 trials.

ErrP:

An error-related potential (ErrP) of EEG dataset. The data consists of $|S|=16$ subjects participating in spelling task, recorded from C=56 channels over T=250 samples for 340 trials. $|Y|=2$ binary labels for erroneous or correct feedback.

Ninapro:

An EMG dataset for fingers motion detection for prosthetic hands for 10 subjects. The subjects repeated 12 finger movements represented by movies that are shown on the screen of a laptop. Each movement repetition lasted 5 seconds and was followed by 3 seconds of rest. The muscular activity was gathered using two Thalmic Myo armbands, having C=16 active differential wireless electrodes at a rate of 200 Hz.

The above example of datasets include various different sensor modalities; specifically, image, electroencephhalogram (EEG), electromyogram (EMG), temperature, heart rate, and so on. Besides those examples, the system of the present invention is applicable to various dataset including a combination of sensor measurements, e.g.,
   a. media data such as images, pictures, movies, texts, letters, voices, music, audios, and speech;
   b. physical data such as radio waves, optical signals, electrical pulses, temperatures, pressures, accelerations, speeds, vibrations, and forces; and
   c. physiological data such as heart rate, blood pressure, mass, moisture, electroencephalogram, electromyogram, electrocardiogram, mechanomyogram, electrooculogram, galvanic skin response, magnetoencephalogram, and electrocorticography.

Model Implementation:

Each of the DNN block is configured with hyperparameters to specify a set of layers with neuron nodes, mutually connected with trainable variables to pass a signal from the layers to layers sequentially. The trainable variables are numerically optimized with the gradient methods, such as stochastic gradient descent, adaptive momentum, Ada gradient, Ada bound, Nesterov accelerated gradient, and root-mean-square propagation. The gradient methods update the trainable parameters of the DNN blocks by using the training data such that output of the DNN blocks provide smaller loss values such as mean-square error, cross entropy, structural similarity, negative log-likelihood, absolute error, cross covariance, clustering loss, divergence, hinge loss, Huber loss, negative sampling, Wasserstein distance, and triplet loss. Multiple loss functions are further weighted with some regularization coefficients according to a training schedule policy.

In some embodiments, the DNN blocks is reconfigurable according to the hyperparameters such that the DNN blocks are configured with a set of fully-connect layer, convolutional layer, graph convolutional layer, recurrent layer, loopy connection, skip connection, and inception layer with a set of nonlinear activations including rectified linear variants, hyperbolic tangent, sigmoid, gated linear, softmax, and threshold. The DNN blocks are further regularized with a set of dropout, swap out, zone out, block out, drop connect, noise injection, shaking, and batch normalization. In yet another embodiment, the layer parameters are further quantized to reduce the size of memory as specified by the adjustable hyperparameters.

As one example of embodiments, all models were trained with a minibatch size of 64 using Adam optimizer with an initial learning rate of 0.001. The learning rate is halved whenever the validation loss plateaus. A compact convolutional neural network (CNN) with 4 layers is employed as an encoder network E to extract features from C×T multi-channel biomedical data. First 3 layers have 1-dimensional (D) temporal convolution kernels to exploit long, medium and short term temporal dependencies. Each temporal convolution is followed by batch normalization and rectified linear unit (ReLU) activation. Final convolution layer is a 1D spatial convolution across all the channels. The AutoBayes chooses either a deterministic latent encoder or variational latent encoder under Gaussian prior. The original data is reconstructed by a decoder network D that applies 1D spatial and temporal transposed convolutions of the same kernel resolutions. Data is split into train (70%) and validation (30%). All methods are without data augmentation and initialized with data normalization. For models where adversarial training is available, the regularization parameter $\lambda_a$ is set to 0.01.

FIG. 10 shows DNN model parameters in FIG. 5; Conv $(h,w)^c_g$ denotes 2D convolution layer with kernel size of $(h,w)$ for output channel of c over group g. FC(h) denotes fully-connected layer with h output nodes. BN denotes batch normalization. For 2D datasets, we use deep CNN for the encoder and decoder blocks. For the classifier, nuisance estimator, and adversary DNN blocks, we use a multi-layer perceptron (MLP) having three layers, whose hidden nodes are doubled from the input dimension. We also use batch normalization (BN) besides ReLU activation. Note that for a tabular data such as Stress datasets, CNN was replaced with 3-layer MLP having ReLU activation and dropout with a ratio of 0.2. Also the MLP classifier was replaced with CNN for 2D input dimension cases such as in the model A. The number of latent dimensions was chosen 64. When we need to feed along with 2D data of into the CNN encoder such as in the model Ds, we use an interpolation to concatenate as additional channel input. For another embodiment of the link concatenation, the system uses multi-dimensional tensor projection with dimension-wise trainable linear filters to convert lower-dimensional signals to larger-dimensional signals for dimension-mismatched links.

Another embodiment integrates AutoML into AutoBayes for hyperparameter exploration of each DNN blocks and learning scheduling. Note that AutoBayes can be readily integrated with AutoML to optimize any hyperparameters of individual DNN blocks. More specifically, the system modifies hyperparameters by using reinforcement learning, evolutionary strategy, differential evolution, particle swarm, genetic algorithm, annealing, Bayesian optimization, hyperband, and multi-objective Lamarckian evolution, to explore different combinations of discrete and continues hyperparameter values.

The system of invention also provides further testing step to adapt as a post training step which refines the trained DNN blocks by unfreezing some trainable variables such that the DNN blocks can be robust to a new dataset with new nuisance variations such as new subject. This embodiment can reduce the requirement of calibration time for new users of HMI systems.

Results: The results in FIGS. 6 and 7 suggest that the best inference strategy highly depends on datasets. Specifically, the best model at one dataset does not perform best for different datasets; e.g., the model Kz was best for Stress dataset, while the simple model B was best for ErrP dataset. It suggests that we shall consider different inference strategies for each target dataset adaptively. The AutoBayes provides such an adaptive framework. In addition, a huge performance gap between the best and worst models was observed for each dataset. For example, the task accuracy of 93.1% was achieved with model Dz for MI dataset, whereas the model Es offers 25.5%. This implies that we may have a potential risk that one particular model cannot achieve good performance if we do not explore different models. Also note that reconstruction loss may not be a good indicator to select the graph model. To efficiently explore potential graphs, one embodiment uses graph neural networks to associate factor graphs, where a belief propagation is applied to progressive prune graph edges from full-chain graphs. Specifically, the set of training schedules include an adaptive control of learning rates, regularization weights, factorization permutations, and policy to prune less-priority links, by using the belief propagation to measure a discrepancy between the training data and the validation data.

Variational Bayesian Inference with Adversarial Training

Variational AE: AutoBayes may automatically construct autoencoder architecture when latent variables are involved, e.g., for the model E in FIG. 3(e). For this case, Z represents a stochastic node to marginalize out for X reconstruction and Y inference, and hence VAE will be required. In contrast to vanilla autoencoders, VAE uses variational inference by assuming a marginal distribution for latent p(z). In variational approach, we reparameterize Z from a prior distribution such as the normal distirbution to marginalize. Depending on the Bayesian graph models, we can also consider reparametering semi-supervision on S (i.e., incorporating a reconstruction loss for S) as a conditioning variable. Conditioning on Y and/or S should depend on consistency with the graphical model assumptions. Since VAE is a special case of CVAE, we will go into further detail about the more general CVAE below.

Conditional VAE:

When X is directly dependent on S or Y along with Z in the Bayesian graph, the AutoBayes gives rise the CVAE architecture, e.g., for the models E/F/G/H/I in FIG. 3. For those generative models, the decoder DNN needs to feed S or Y as a conditioning parameter. Even for other Bayesian graphs, the S-first inference strategy will require conditional encoder in CVAE, e.g., the models Ds/Es/Fs/Gs/Js/Ks in FIG. 4, where latent Z depends on S.

Consider the case when S plays as the conditioning variable in a data model with the factorization:

$$p(s,x,z)=p(s)p(z)p(x|s,z), \quad (13)$$

where we directly parameterize p(x|s, z), set p(z) to something simple (e.g., isotropic Gaussian), and leave p(s) arbitrary (since it will not be directly used). The CVAE is trained according to maximizing the likelihood of data tuples (s,x) with respect to p(x|s), which is given by $$p(x|s)=\int p(x|s,z)p(z)dz, \quad (14)$$

which is intractable to compute exactly given the potential complexity of the parameterization of p(x|s, z). While it could be possible to approximate the integration with sampling of Z, the crux of the VAE approach is to utilize a variational lower-bound of the likelihood that involves a variational approximation of the posterior p(z|s,x) implied by the generative model. With q(z|s,x) representing the variational approximation of the posterior, the Evidence Lower-Bound (ELBO) is given by $$\log p(x|s) \geq E_{z:q(z|s,x)}[\log p(x|s,z)] - KL(q(z|s,x)Pp(z)). \quad (15)$$

The parameterization of the variational posterior q(z|s,x) may also be decomposed into parameterized components, e.g., q(z|s, x)=q(s|x)q(z|s,x) such as in the S-first models shown in FIG. 4. Such decomposition also enables the possibility of semi-supervised training, which can be convenient when some of the variables, such as the nuisances variations, are not always labeled. For data tuples that include s, the likelihood q(s|x) can also be directly optimized, and the given value for s is used an input to the computation of q(z|s, x). However, for tuples where s is missing, the component q(s|x) can be used to generate an estimate of s to be input to q(z|s, x). We further discuss embodiments of semi-supervised learning and the sampling methods for categorical nuisance variables later.

Adversarial CVAE:

We can utilize adversary censoring when Z and S should be marginally independent, e.g., such as in FIG. 1(b) and FIG. 5, in order to reinforce the learning of a representation Z that is disentangled from the nuisance variations S. This is accomplished by introducing an adversarial network that aims to maximize a parameterized approximation q(s|z) of the likelihood p(s|z), while this likelihood is also incorporated into the loss for the other modules with a negative weight. The adversarial network, by maximizing the log likelihood log q(s|z), essentially maximizes a lower-bound of the mutual information I(S,Z), and hence the main network is regularized with the additional term that corresponds to minimizing this estimate of mutual information. This follows since the log-likelihood maximized by the adversarial network is given by $$E[\log q(s|z)]=I(S;Z)-H(S)-KL(p(s|z)Pq(s|z)), \quad (16)$$

where the entropy H(S) is constant.

In yet another embodiment, the adversary DNN blocks are configured to learn the trainable variables such that a set of latent vectors are minimally related to a combinations of the nuisance variations, using an alternating update of gradient ascents and gradient descents, where the adversary DNN blocks are further configured to minimize the discrepancy of the encoder DNN block and the decoder DNN blocks, called cycle consistency loss.

Semi-Supervised Learning: Categorical Sampling

Graphical Models for Semi-Supervised Learning:

Nuisance values S such as subject ID or session ID may not be always available for typical physiological datasets, in particular for the testing phase of an HMI system deployment with new users, requiring semi-supervised methods. We note that some graphical models are well-suited for such semi-supervised training. For example, among the Bayesian graph models in FIG. 3, the models C/E/G/I require the nuisance S to reproduce X. If no ground-truth labels of S are available, we need to marginalize S across all possible categories for the decoder DNN D. Even for other Bayesian graphs, the corresponding inference factor graphs in FIG. 4 may not be convenient for the semi-supervised settings. Specifically, for models Ez/Fz/Jz/Kz have an inference of S at the end node, whereas the other inference models use inferred S for subsequent inference of other parameters. If S is missing or unknown as a semi-supervised setting, those inference graphs having S in a middle node are inconvenient as we need sampling over all possible nuisance categories. For instance, the model Kz shown in FIG. 5 does not need S marginalization, and thus readily applicable to semi-supervised datasets.

Variational Categorical Reparameterization:

In one embodiment, the variational sampling is employed for the latent variables with an isometric normal distribution as its prior distribution for reparameterization tricks, and for categorical variables of unknown nuisance variations and task labels using the Gumbel softmax trick to produce near-one-hot vectors based on a random number generator. Specifically, in order to deal with the issue of categorical sampling, we can use the Gumbel-Softmax reparameterization trick, which enables differentiable approximation of one-hot encoding. Let $[\pi_1, \pi_2, \ldots, \pi_{|S|}]$ denote a target probability mass function for the categorical variable S. Let $g_1, g_2, \ldots, g_{|S|}$ be independent and identically distributed samples drawn from the Gumbel distribution Gumbel(0,1). In this case, Gumbel(0,1) is realized by drawing uniform random variable u: Uniform(0,1) and computing g=−log(−log(u)). Then, generate an |S|-dimensional vector ŝ= [ŝ$_1$, ŝ$_2$, . . . , ŝ$_{|S|}$] according to $$\hat{s}_k = \frac{\exp((\log(\pi_k) + g_k)/\tau)}{\sum_{i=1}^{|S|} \exp((\log(\pi_i) + g_i)/\tau)}, \quad (17)$$

where τ>0 is a softmax temperature. As the softmax temperature τ approaches 0, samples from the Gumbel-Softmax distribution become one-hot and the distribution becomes identical to the target categorical distribution. The temperature r is usually decreased across training epochs as an annealing technique, e.g., with exponential decaying specified with a scheduling policy.

Figure 11:
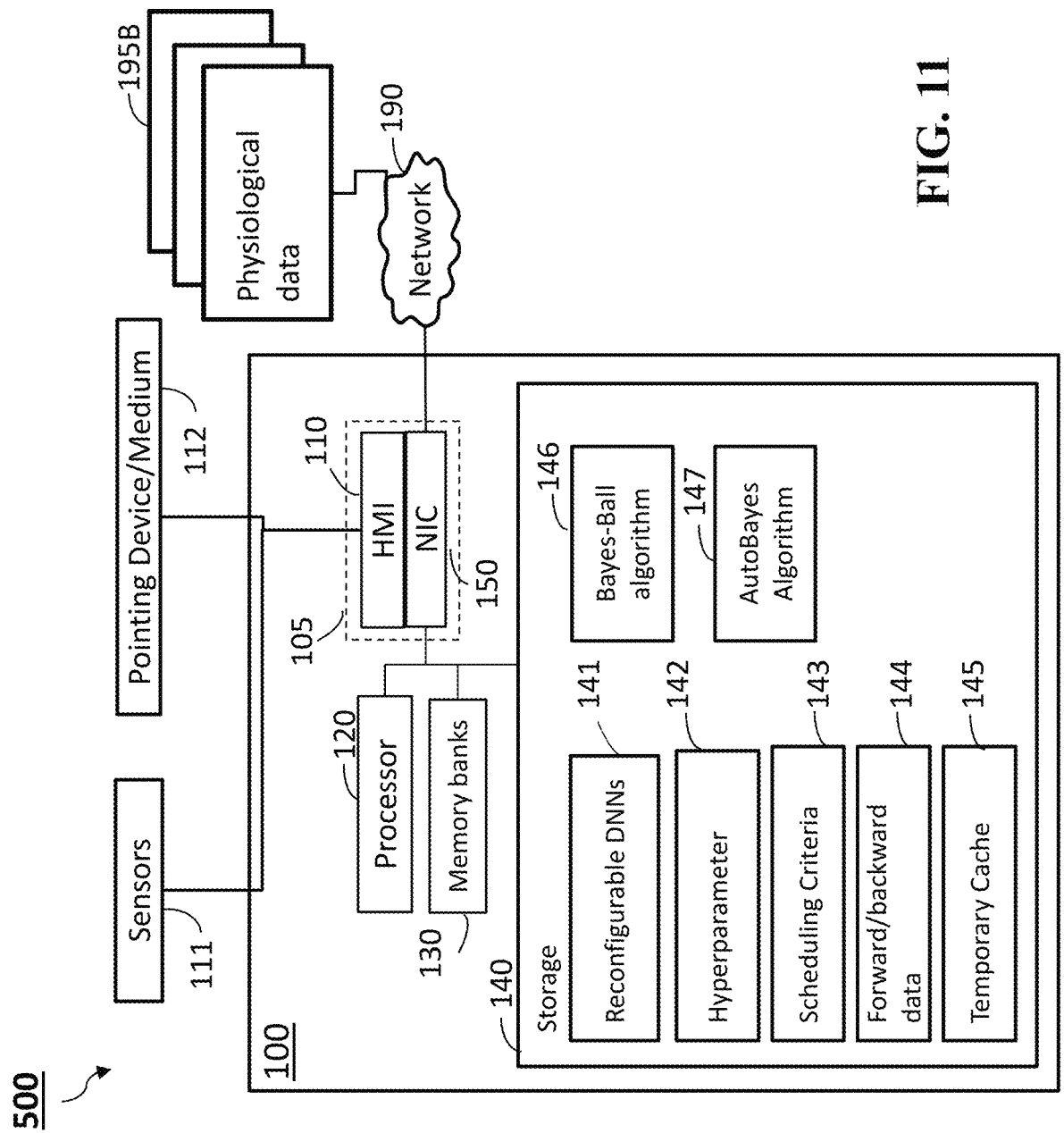
FIG. 11 shows a schematic of the system configured with processor, memory and interface, according to embodiments of the present disclosure.

FIG. 11 is a block diagram illustrating an example of a system 500 for automated construction of an artificial neural network architecture, to some embodiments of the present disclosure. The system 500 includes a set of interfaces and data links 105 configured to receive and send signals, at least one processor 120, a memory (or a set of memory banks) 130 and a storage 140. The processor 120 performs, in connection with the memory 130, computer-executable programs and algorithms stored in the storage 140. The set of interfaces and data links 105 may include a human machine interface (HMI) 110 and a network interface controller 150. The processor 120 can perform the computer-executable programs and algorithms in connection with the memory 130 that uploads the computer-executable programs and algorithms from the storage 140. The computer-executable programs and algorithms stored in the storage 140 may be reconfigurable deep neural networks (DNNs) 141, a hyperparameter(s) 142, scheduling criteria 143, forward/backward data 144, temporary caches 145, Bayes-Ball algorithm 146, and AutoBayes algorithm 147.

The system 500 can receive the signals via the set of interfaces and data links. The signals can be datasets of training data, validation data and testing data and the signals that include a set of random number factors in multi-dimensional signals X, wherein part of the random number factors are associated with task labels Y to identify, and nuisance variations S.

In some cases, each of the reconfigurable DNN blocks (DNNs) 141 is configured either for encoding the multi-dimensional signals X into latent variables Z, decoding the latent variables Z to reconstruct the multi-dimensional signals X, classifying the task labels Y, estimating the nuisance variations S, adversary estimating the nuisance variations S, or selecting a graphical model. In this case, the memory banks further include hyperparameters, trainable variables, intermediate neuron signals, and temporary computation values including forward-pass signals and backward-pass gradients.

The at least one processor 120 is configured to, in connection with the interface and the memory banks 105, submit the signals and the datasets into the reconfigurable DNN blocks 141. Further the at least one processor 120 executes a Bayesian graph exploration using the Bayes-Ball algorithm 146 to reconfigure the DNN blocks such that redundant links are pruned to be compact by modifying the hyperparameters 142 in the memory banks 130.

The system 500 can be applied to design of human-machine interfaces (HMI) through the analysis of user's physiological data. The system 500 may receive physiological data 195B as the user's physiological data via a network 190 and the set of interfaces and data links 105. In some embodiments, the system 500 may receive electroencephalogram (EEG) and electromyogram (EMG) from a set of sensors 111 as the user's physiological data.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A system for automated construction of an artificial neural network architecture for designing a human-machine interface (HMI) system, comprising:
a set of interfaces and data links configured to receive and send signals with respect to image, electroencephhalogram (EEG), electromyogram (EMG), temperature, heart rate or combination thereof, wherein the signals include datasets of training data, validation data and testing data, wherein the signals include a set of random number factors in multi-dimensional signals X, wherein part of the random number factors are associated with task labels Y to identify, and nuisance variations S;
a set of memory banks to store computer-executable algorithms including a Bayes-Ball algorithm, a set of reconfigurable deep neural network (DNN) blocks of the HMI system, wherein the memory banks further include hyperparameters, trainable variables, intermediate neuron signals, and temporary computation values including forward-pass signals and backward-pass gradients;
at least one processor, in connection with the interface and the memory banks, configured to perform steps of the computer-implemented algorithms, wherein the steps comprise:

submitting the signals and the datasets into the reconfigurable DNN blocks, wherein each of the set of reconfigurable DNN blocks, based on the signals and the datasets, performs either encoding the multi-dimensional signals X into a plurality of latent variables Z, decoding the latent variables Z to reconstruct the multi-dimensional signals X, classifying the task labels Y, estimating the nuisance variations S, adversary estimating the nuisance variations S or selecting a graphical model; and constructing automatically compact DNN blocks from the DNN blocks by automatically pruning redundant links of the DNN blocks by modifying the hyperparameters of the DNN blocks in the memory banks by executing the Bayes-Ball algorithm.

2. The system of claim 1, wherein at least one processor executes steps:

modifying the hyperparameters to specify a set of training schedules, a set of internal layers of the reconfigurable DNN blocks, and a set of criteria underlying the datasets;

creating a full-chain directed Bayesian graph configured to link multiple nodes with graph edges and associate graph nodes with the random number factors with respect to the multi-dimensional signals X, the task labels Y, the nuisance variations S and the latent variables Z in a specific permutation order according to the set of criteria;

pruning a specific combination of the graph edges in the permuted full-chain Bayesian graph according to the set of criteria specifying a hypothetic Bayesian graph model to represent a stochastic behavior of the datasets;

listing conditional independency relations across two disjoint nodes in the pruned Bayesian graph using the Bayes-Ball algorithm;

creating another full-chain directed factor graph stemming from the node associated with the data signals X to infer the other nodes;

pruning redundant links in the full-chain factor graph according to the independency list such that node connectivity is compact;

merging the pruned Bayesian graph and the pruned factor graph such that a generative model and an inference model are consistent according to the hypothetic graph models;

attaching adversary reconfigurable DNN blocks to some of latent nodes Z which are independent to some of nuisance variations S in the independency list;

assigning other reconfigurable DNN blocks for the encoder, decoder, nuisance estimator and task classifier with a plural of links to concatenate multiple data to feed, according to the link connectivity specified by the merged factor graph;

training all of the reconfigurable DNN blocks constructed with connected DNN blocks for the encoding, decoding, estimating, classifying, adversary estimating and model selecting with a variational sampling and a gradient method according to the specified training schedules;

selecting the graph model using model selector DNN based on the output of all of the reconfigurable DNN blocks for the validation data;

repeating the above executions according to the specified schedules; and testing the trained reconfigurable DNN blocks for the testing data and new incoming data on the fly to be transferred with nuisance robustness.

3. The system of claim 2, wherein the variational sampling is employed for the latent variables with an isometric normal distribution as its prior distribution for parameterization tricks, and for categorical variables of unknown nuisance variations and task labels using Gumbel softmax trick to produce near-one-hot vectors based on a random number generator and a softmax temperature.

4. The system of claim 2, wherein the link concatenation further comprising a step of multi-dimensional tensor projection with a plural of trainable linear filters to convert lower-dimensional signals for dimension-mismatched links.

5. The system of claim 2, wherein the model selection further comprising a step of voting the multiple output of hypothetic graphical models with a weighted ensemble sum according to a model selector DNN block, which takes a model consensus, attention mechanism, and cycle consistency of encoder/decoder DNN blocks into consideration.

6. The system of claim 1, wherein the reconfigurable DNN blocks are configured with a combination of fully-connect layer, convolutional layer, graph convolutional layer, recurrent layer, loopy connection, skip connection, and inception layer with a set of nonlinear activations including rectified linear variants, hyperbolic tangent, sigmoid, gated linear, softmax, and threshold, regularized with a combination of dropout, swap out, zone out, block out, drop connect, noise injection, shaking, and batch normalization, wherein the layer parameters are further quantized to reduce the size of memory as specified by the plural of hyperparameters to be adjusted with the processor.

7. The system of claim 2, wherein the training performs updating the trainable parameters of the reconfigurable DNN blocks by using the training data such that output of the reconfigurable DNN blocks provide smaller loss values in a combination of objective functions, wherein the objective functions further include a combination of mean-square error, cross entropy, structural similarity, negative log-likelihood, absolute error, cross covariance, clustering loss, divergence, hinge loss, Huber loss, negative sampling, Wasserstein distance, and triplet loss, wherein the loss functions are weighted with a plural of regularization coefficients adjusted according to the specified training schedules.

8. The system of claim 2, wherein the gradient method employs a combination of stochastic gradient descent, adaptive momentum, Ada gradient, Ada bound, Nesterov accelerated gradient, and root-mean-square propagation for optimizing the trainable parameters of the reconfigurable DNN blocks.

9. The system of claim 1, wherein the datasets include a combination of sensor measurements further comprising:

media data such as images, pictures, movies, texts, letters, voices, music, audios, and speeches;

physical data such as radio waves, optical signals, electrical pulses, temperatures, pressures, accelerations, speeds, vibrations, and forces; and physiological data such as heart rate, blood pressure, mass, moisture, electroencephalogram, electromyogram, electrocardiogram, mechanomyogram, electrooculogram, galvanic skin response, magnetoencephalogram, and electrocorticography.

10. The system of claim 1, wherein the nuisance variations include a set of subject identifications, session numbers, biological states, environmental states, sensor states, locations, orientations, sampling rates, time and sensitivities.

11. The system of claim 1, wherein each of the reconfigurable DNN block further comprises hyperparameters specifying a set of layers having a set of artificial neuron nodes, wherein a pair of the neuron nodes from neighboring layers are mutually connected with a plural of trainable variables and activation functions to pass a signal from the previous layers to the next layers sequentially.

12. The system of claim 1, wherein the nuisance variations S are further decomposed into multiple factors of variations S1, S2, SN as multiple-domain side information according to a combination of supervised, semi-supervised and unsupervised settings, wherein the latent variables are further decomposed into multiple factors of latent variables Z1, Z2, ..., ZL as disentangled feature vectors.

13. The system of claim 2, wherein the modifying hyperparameters employs a combination of reinforcement learning, evolutionary strategy, differential evolution, particle swarm, genetic algorithm, annealing, Bayesian optimization, hyperband, and multi-objective Lamarckian evolution, to explore different combinations of discrete and continues hyperparameter values.

14. The system of claim 2, wherein the testing step further comprising a post training step which refines the trained reconfigurable DNN blocks by unfreezing a combination of the trainable variables such that the reconfigurable DNN blocks adapt to a new dataset with new nuisance variations.

15. The system of claim 2, wherein the adversary reconfigurable DNN blocks are configured to learn the trainable variables such that a set of latent vectors are minimally related to a combinations of the nuisance variations, using an alternating update of gradient ascents and gradient descents, wherein the adversary reconfigurable DNN blocks are further configured to minimize the discrepancy of the encoder DNN block and the decoder DNN blocks.

16. The system of claim 2, wherein the set of training schedules include an adaptive control of learning rates, regularization weights, factorization permutations, and policy to prune less-priority links, by using a belief propagation to measure a discrepancy between the training data and the validation data.

* * * * *